Feb. 16, 1965   H. N. EAGLETON   3,169,263
SPHERE LAUNCHING APPARATUS
Filed Jan. 23, 1962   6 Sheets-Sheet 1

Fig. 1.

INVENTOR.
Harold N. Eagleton
BY
William S. Dorman
ATTORNEY

Fig. 2.

INVENTOR.
Harold N. Eagleton
BY
William S. Dorman
ATTORNEY

INVENTOR.
Harold N. Eagleton

INVENTOR.
Harold N. Eagleton
BY
William S. Dorman
ATTORNEY

Feb. 16, 1965   H. N. EAGLETON   3,169,263
SPHERE LAUNCHING APPARATUS
Filed Jan. 23, 1962   6 Sheets-Sheet 6

INVENTOR.
Harold N. Eagleton
BY
William S. Dorman
ATTORNEY

United States Patent Office 3,169,263
Patented Feb. 16, 1965

3,169,263
SPHERE LAUNCHING APPARATUS
Harold N. Eagleton, Colorado Springs, Colo., assignor to Charles Wheatley Company, Tulsa, Okla., a corporation of Oklahoma
Filed Jan. 23, 1962, Ser. No. 168,599
5 Claims. (Cl. 15—104.06)

This invention relates to improvements in launching apparatus, and more particularly, but not by way of limitation, to a launching device for admitting spheroids, or the like, into the interior of a pipe line.

Pipe lines are in wide spread usage today for delivering or transporting gas and oil products from the oil well site to the handling plant. The movement of natural gas through a pipe line presents many problems, and one particularly difficult problem is the handling of the condensation in the pipe line as the gas stream flows or moves therethrough. The condensation collects in each of hundreds of sags inherent in a pipe line crossing a rolling country side. The gasoline contained within each sag becomes an impediment to the flow of the gas through the pipe line. In order to move this condensate through the pipe line, it has become increasingly desirable to move a spheroid, or pipe line pig, through the pipe line to force the condensate therethrough. The pig is normally propelled through the pipe line by the pressure of the gas stream itself, and has proven to be an expedient means for solving the problem.

The pipe line usually comprises a plurality of progressively larger or smaller diameter sizes, and it is desirable to inject a pig or spheroid at multiple intervals along the pipe line in accordance with the diameter variances therein. In addition, the pipe line extends through long distances over the country side or open spaces and is frequently unattended. It is, therefore, desirable to provide an automatic launching means at the desired intervals along the pipe line for injecting the spheroids into the interior thereof.

The present invention contemplates a novel sphere launcher apparatus wherein a spheriod or pig may be automatically launched or delivered into the interior of the pipe. The launching valve is particularly designed and constructed for injecting a single sphere into the pipe line while positively precluding the dumping of a plurality of the spheres during the single launching operation. The novel launching valve or apparatus may be interposed in a conduit disposed at an angle with respect to the horizontal, whereby the spheres loaded therein tend to move in a direction toward the launching mechanism by gravity. The launching mechanism is normally in a closed position for precluding entrance of a sphere into the pipe line until such a time as the valve means is opened. When it is desired to launch one of the spheres or inject a sphere into the pipe line, the launching mechanism is actuated whereby one sphere is free to move through the launching valve for dropping by gravity into the interior of the pipe line. As the valve is opened for passing one sphere, the next succeeding sphere is intercepted for precluding the passage of two or more spheres during the launching operation. After the sphere has entered the pipe line, the gas pressure in the pipe line forces or moves the sphere therethrough, and the launching valve may be closed and reset in preparation for the next launching operation.

It is an important object of this invention to provide a launching apparatus for injecting a spheroid, or pipe line pig, into a pipe line for passage therethrough.

It is another object of this invention to provide a novel launching apparatus which may be interposed at multiple intervals along a pipe line for automatically launching spheroids into the interior of the pipe line.

Still another object of this invention is to provide a novel launching apparatus wherein a spheroid may be injected into the interior of a pipe line and which simultaneously intercepts the next succeeding spheriod for precluding the passage of multiple spheriods into the pipe line during the single launching operation.

It is a further object of this invention to provide a novel launching apparatus for automatically injecting spheroids into a pipe line and which may be readily manually actuated in lieu of the automatic operation.

It is a still further object of this invention to provide a novel launching apparatus for injecting spheroids into a pipe line that is simple and efficient in operation and economical and durable in construction.

Other objects and advantages of the invention will be evident from the following detailed description, read in conjunction with the accompanying drawings, which illustrate my invention.

Figure 1:
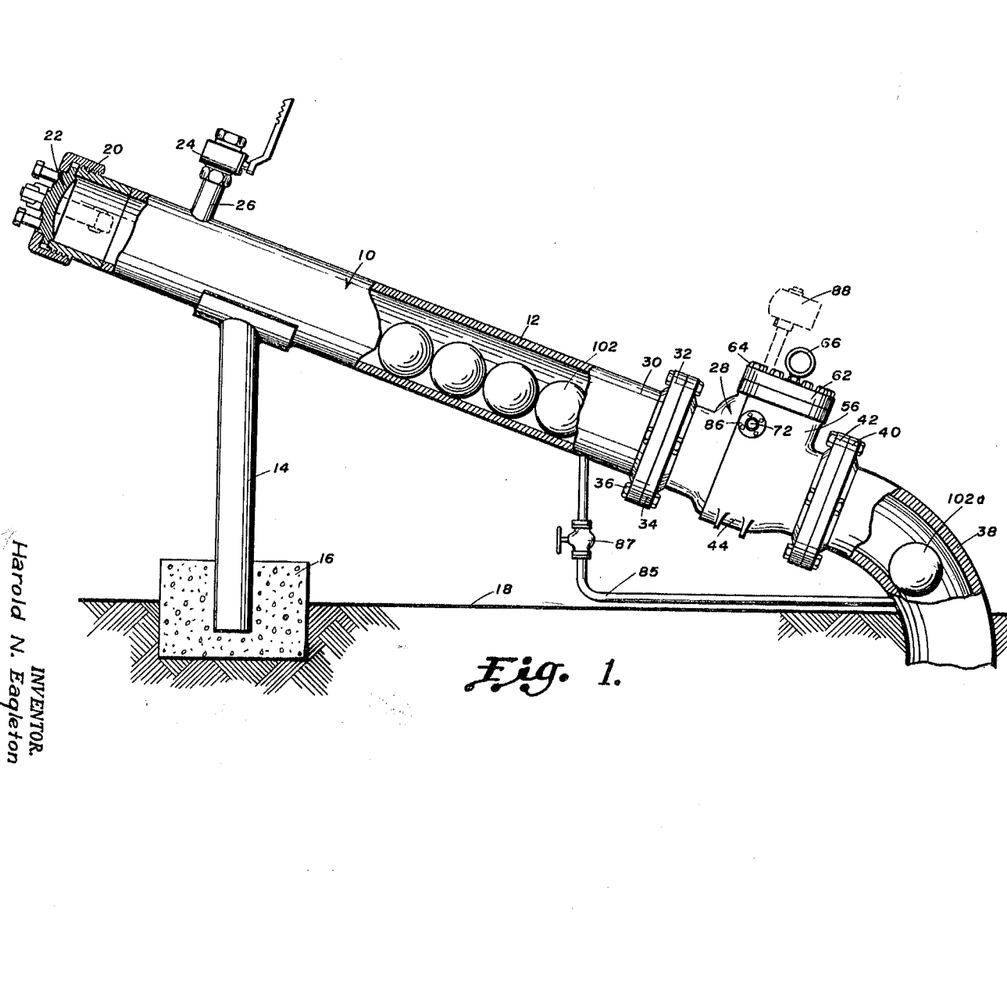
FIGURE 1 is a side elevational view, partly in section, of a launching apparatus embodying the invention.

Referring to the drawings in detail, and particularly FIG. 1, reference character 10 generally indicates a launching apparatus comprising an elongated launching tube or conduit 12 supported by a suitable upright leg member 14 which is preferably embedded in a concrete base member 16, or the like, provided in the ground 18. The launching tube 12 is disposed at an angle with respect to a horizontal plane, as clearly shown in FIG. 1, and the recommended angular range thereof is preferably between fifteen degrees and forty-five degrees in order that gravitational force may be utilized in the operation of the apparatus, as will be hereinafter set forth. One end 20 of the tube 12 is open and is provided with a suitable closure member 22 which is preferably threadedly secured thereon, but not limited thereto, in order to provide for access to the interior of the tube 12. A bleed off or blow down valve 24 may be secured to the tube 12 by means of a conduit 26 and spaced from the end 20 in order to bleed the pressure from the interior of the tube 12 prior to removal of the cover or closure member 22, as is well known.

A launching valve 28 is secured to the opposite end 30 of the tube 12 in any suitable manner. As depicted herein, the end 30 of the tube 12 is provided with a flange fitting 32 complementary to a flange member 34 provided on the valve 28, and the mating flanges 32 and 34 may be secured together by a plurality of studs 36, or the like. An elbow conduit 38 is secured to the opposite end of the valve 28 in a similar manner, such as by a pair of complementary flanges 40 and 42, and extends downwardly therefrom into open communication with a pipe line (not shown). It will be apparent that communication is thus established from the end 20 of the tube 12, through the valve 28, and elbow member 38, to the pipe line, which may be buried in the ground 18. It is to be noted that pipe lines are constructed both under the ground and on top thereof, and the launching apparatus may be utilized with equal efficiency with either type of installation.

The valve 28 may be of any suitable type, and preferably comprises a substantially cylindrical body portion 44 having the flange members 34 and 42 secured thereto in any well known manner, such as by welding, or the like. The body 44 is provided with opposed inlet and outlet ports 46 and 48 adjacent the flanges 34 and 42, respectively. An inwardly directed annular shoulder 50 is provided integral with the body 44 adjacent the inlet port 46 and extends within the body 44 to provide a seat for a closure member or clapper 52. The closure member 52 is provided with an annular sealing member 54 on one face thereof adjacent the seat 50 for sealing the valve 28 in the closed position thereof.

Figure 2:
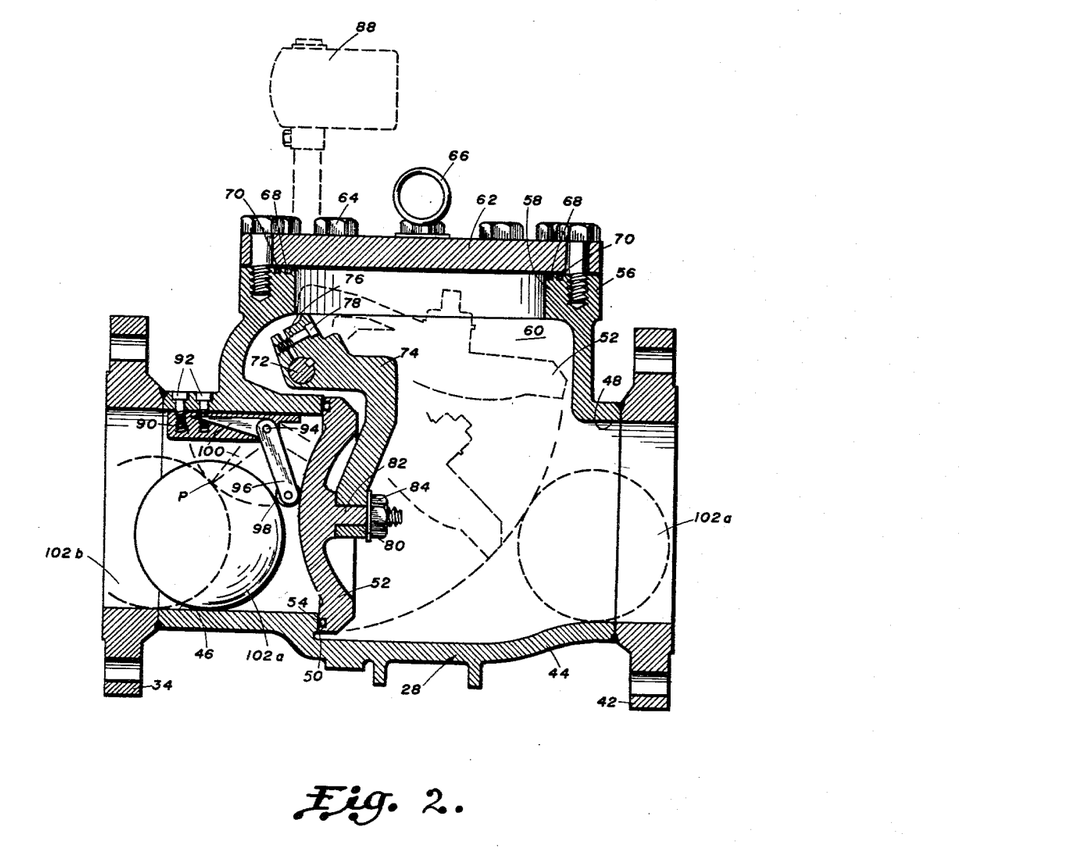
FIGURE 2 is a sectional elevational view of a launching valve embodying the invention, with portions depicted in dotted lines for purposes of illustration.

A sleeve or neck member 56 extends upwardly from the body 44, as viewed in FIG. 2, and is provided with a central access bore 58. A chamber 60 is provided within the sleeve 56 in communication with the interior of the body 44 to receive the clapper member 52 in the open position of the valve 28, as will be hereinafter set forth. A cover plate 62 is removably secured to the neck 56 by a plurality of threaded studs 64 to close the access port 58. A suitable handle or grip member 66 may be provided on the cover 62 for facilitating the handling thereof, if desired. A plurality of annular sealing members 68 and 70 are disposed on the neck 56 around the bore 58 and adjacent the cover member 62 for providing a seal therebetween.

A pivot shaft 72 extends transversely through the chamber 60 and may be journalled therein in any suitable manner (not shown). An angular arm member 74 is keyed or otherwise secured to the shaft 72 and may be clamped therearound by means of a bifurcated shank 76 and a cooperating screw member 78. The opposite end of the arm 74 is provided with a bore 80 for receiving an outwardly extending threaded stud member 82 provided on the closure member 52. The stud member 82 may be retained within the bore 80 by a suitable nut 84, thus securing the clapper 52 to the arm 74. It will be readily apparent that the shaft 72 is the pivot shaft for the arm 74 and the arm 74 rotates simultaneously therewith for moving the closure member 52 alternately toward and away from the valve seat 50, as shown in dotted lines in FIG. 2.

The pivot shaft 72 preferably extends through the side walls of the sleeve 56, as shown in FIG. 1, and may be provided with any suitable stuffing gland 86 for precluding leakage of fluid therearound. One exposed end of the shaft 72 may be connected or engaged in any well known manner (not shown) by any suitable pneumatic, electrical, hydraulic, or the like, automatic operator, such as the automatic valve actuator manufactured by the Bettis Corporation under the registered trade name "RobotArm." The valve operator or actuator functions to rotate the shaft 72 in one direction for moving the closure member 52 in a counterclockwise direction, as viewed in FIG. 2, for opening the valve 28, and in an opposite direction for moving the closure member 52 in a clockwise direction for closing the valve 28, as will be hereinafter set forth in detail. In addition, a manually operated lever arm 88, shown in dotted lines, may be suitably secured to the opposite exposed end of the shaft 72 to provide for manual rotation thereof in the event the valve actuator fails to operate, or if for any other reason it is desired to manually actuate the launching valve 28.

It is desirable to provide a by-pass conduit 85 (FIG. 1) extending between the elbow 38 and the tube 12 for communication between the interiors thereof to equalize the pressures therein. A suitable valve 87 is provided in the conduit 85 for intermittently shutting off the communication between the tube 12 and elbow 38 when the tube 12 is being loaded, as will be hereinafter set forth.

Figure 6:
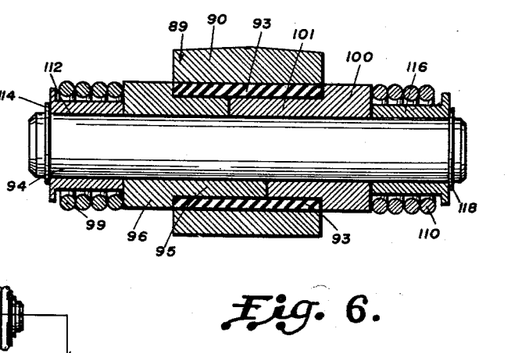
FIGURE 6 is an enlarged sectional elevational view taken on line 6—6 of FIG. 5.

A launching mechanism, generally indicated at 89, is disposed within the body 44 and comprises a flange boss or bracket member 90 secured to the inner periphery of the body 44 in any well known manner, such as a plurality of screws 92. The bracket 90 is preferably disposed in the proximity of the inlet bore 46 and is provided with an aperture 91 (FIG. 3) having a bearing sleeve 93 disposed therein for loosely receiving a transversely extending shaft member 94. A finger or follower arm member 96 is journalled on the shaft 94 and is provided with a reduced sleeve member 95 which extends into the bearing sleeve 93 as clearly shown in FIG. 6. A roller member or follower member 98 is journalled in a slot 97 provided on the outer extremity of the finger or arm member 96, and is constantly urged in a direction toward the clapper 52 by the action of a spring member 99, as will be hereinafter set forth in detail.

Figure 3:
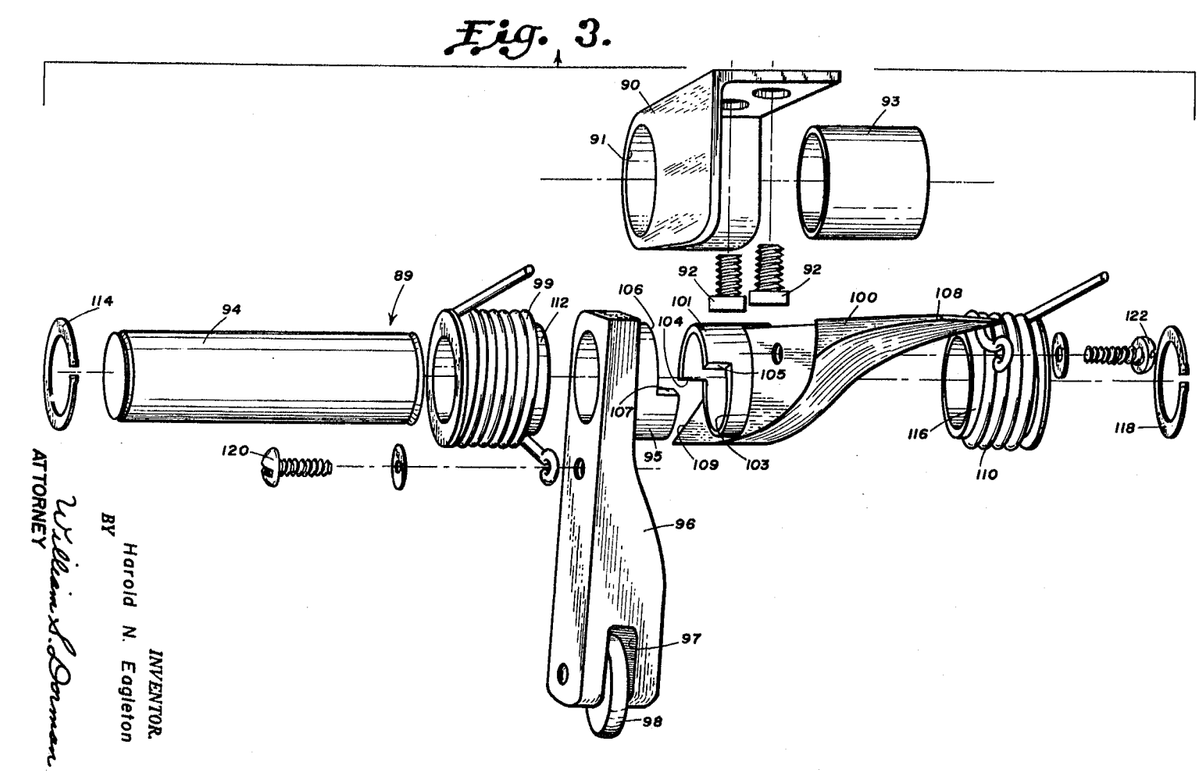
FIGURE 3 is an exploded perspective view of the launching mechanism embodying the invention as shown in FIG. 2 and which may be utilized with a plurality of launching valve structures.

A second arm member of finger 100 is journalled on the shaft 94 and is provided with a reduced sleeve member 101 inserted between the shaft 94 and the bearing sleeve 93 and oppositely disposed with respect to the sleeve 95. The finger 100 is angularly disposed with respect to the arm or finger 96, as clearly shown in FIG. 4, and functions as a catching finger during the passage of spheroids or pigs 102 through the valve 28, as will be hereinafter set forth. The sleeve 101 cooperates with the sleeve 95 to provide a clutching type action between the arms 96 and 100 during the rotation thereof around the shaft 94. The sleeve 101 is provided with a circumferential cut away portion 103 (FIG. 3) providing a pair of longitudinally extending clutch shoulders 104 and 105. The cut away portion 103 preferably extends through an arc slightly exceeding half of the circumference of the sleeve 101, but not limited thereto. The sleeve 95 is provided with a similar circumferential cut away portion 106 providing a pair of longitudinal clutch shoulders 107 (only one of which is shown in FIG. 3) extending in a direction toward the sleeve 101. The cut away portion 106 extends through a substantially greater arc of the circumference of the sleeve 95 than the arc of the cut away portion 103, thus providing for limited independent rotation of the finger 96 with respect to the finger 100, as will be hereinafter set forth.

The finger 100 is preferably tapered at one end 108 thereof to provide a catching element for contacting one of the spheroids 102, as will be hereinafter set forth. The opposite end of the finger 100 is provided with a flat portion 109 for engaging the periphery of the inlet bore 46 in order to limit the rotation of the catching finger 100 in one direction. The catching finger 100 is constantly urged in a direction toward the clapper 52 by the action of a spring 110. As hereinbefore set forth, the follower arm 96 is similarly urged in a direction toward the clapper 52 by the action of the spring 99. The spring 99 is disposed around a suitable flanged bushing member 112 (FIG. 6) which is securely retained in position on the shaft 94 by a locking washer or snap ring 114, as is well known. The spring 110 is similarly disposed around a flanged bushing member 116 which is securely retained in position on the shaft 94 by a locking ring 118. The bushing members 112 and 116 cooperate for retaining the sleeve 95 and 101 in an abutting relationship on the shaft 94 and within the bearing sleeve 93, as clearly shown in FIG. 6. The spring 99 is anchored at one end to the finger 96 by a screw 120 and at the opposite end to the bracket 90 in any suitable manner. The spring 110 is similarly anchored at one end to the follower arm 100 by a screw 122 and at the opposite end to the bracket 90 in any suitable manner.

Figure 4:
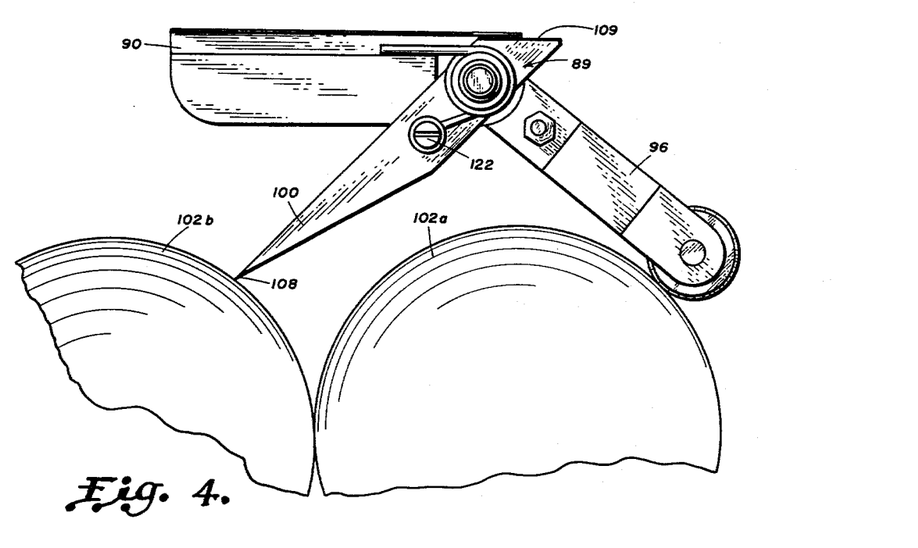
FIGURE 4 is a side elevational view of the launching mechanism depicted in FIG. 2 with portions depicted in dotted lines for purposes of illustration.
Figure 5:
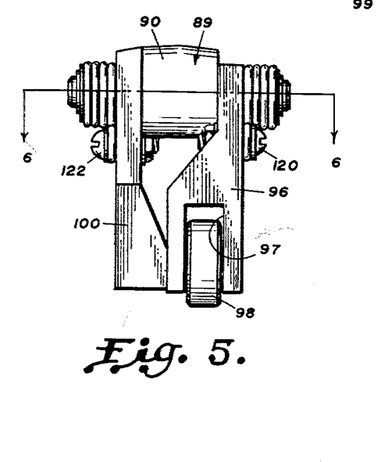
FIGURE 5 is a front elevational view of the launching mechanism depicted in FIG. 4.

As the clapper 52 is moved toward an open position, the two arms 96 and 100 move independently but simultaneously in a counterclockwise direction about the shaft 94, as viewed in FIGS. 2 and 4. The arm 96 is rotated by the action of the spring 99 and the arm 100 is rotated independently therefrom by the action of the spring 110. The arm 100 is limited in its counterclockwise rotation by the engagement of the flat portion 109 thereof against the periphery of the bore 46. The arm 100 is preferably so designed and constructed that the angular position thereof in the limiting position will be substantially forty-five degrees from the horizontal whereby the outer extremity 108 thereof will be in the position P as indicated in dotted lines in FIG. 2. The arm 96 will continue to rotate or follow the clapper 52 subsequent to the stopping of the arm 100 until the respective shoulder 107 of the sleeve 95 moved into contact or engagement with the shoulder 104 of the sleeve 103. As hereinbefore set forth, the cut away portion 106 is of a greater arc than the cut away portion 103, and it is preferable that the difference therebetween be sufficiently great that the arm 96 will continue to rotate through an additional angle of approximately thirty-eight degrees subsequent to the stopping of the arm 100, but not limited thereto. This angular rotational differential permits the arm 96 to move to a position substantially parallel with the longitudinal axis of the bore 46 in order to provide clearance for the passage of the spheroids 102 through the valve 28, as will be hereinafter set forth in detail.

When the clapper 52 is moved toward a closed position, the arm 96 is rotated in a clockwise direction thereby, independently of the catching finger 100, which remains in the stopped or limited position thereof. When the arm 96 has been rotated through a sufficiently great arc, the respective clutch shoulder 107 thereof is brought into contact with the clutch shoulder 105 of the sleeve 101. A continued movement of the clapper 52 toward the closed position will rotate the arm 96 further, whereby the contact between the shoulders 107 and 105 will transmit rotation to the arm 100 against the action of the spring 110. In the fully closed position of the clapper 52, as shown in FIG. 2, the catcher arm 100 will be disposed substantially parallel to the longitudinal axis of the bore 46, thus providing clearance for the spheroids 102, as will be hereinafter set forth.

*Operation*

In order to load the launching apparatus 10 with the spheroids 102, the pressure in the line or tube 12 is bled off through the blow out valve 24 by opening the valve 24 in the usual manner for exhausting of the internal pressure in the tube 12 to the atmosphere. Prior to the opening of the blow out valve 24, the valve 87 in the conduit 85 is closed for precluding communication of the internal pressure of the elbow 38 to the tube 12. After relieving the internal pressure in the tube 12, the closure member 22 may be removed from the open end 20 of the tube 12, thus providing access to the interior of the launching apparatus 10. A plurality of the spheroids or pigs 102 may be inserted into the tube 12. The angular disposition of the tube 12 facilitates the movement of the spheres or orbs 102 downwardly therein by gravity to a position adjacent the closed valve 28. It will be readily apparent that the first sphere 102a will be in the proximity of the clapper member 52, and will rest against the roller or follower member 98 provided on the arm 96, as clearly shown in FIG. 2. The plurality of spheres 102 will accumulate within the tube 12 with each successive phere resting against the adjacent orb, as shown in FIG. 1. When the desired number of orbs or spheroids 102 have been disposed or inserted into the tube 12, the end closure member 22 may be replaced on the end 20 thereof, and securely locked thereon in the usual manner. The blow out valve 24 may then be closed and the valve 87 may be opened whereby the pressure within the tube 12 may build up or become equalized with the pressure in the elbow 38, and thus equal to the pressure in the pipe line (not shown).

The automatic valve operator (not shown) may be utilized for automatically opening the launching valve 28 when it is desired to inject or launch one of the spheres 102 into the interior of the pipe line. The automatic valve operator may be adjusted or set to operate the valve 28 at desired time intervals, or in accordance with substantially any desired pattern of injection of the spheres 102 into the pipe line. The automatic valve operator functions to rotate the shaft 72 in a counterclockwise direction, as viewed in FIG. 2, when it is desired to open the valve 28, and to rotate the shaft 72 in a clockwise direction when it is desired to close the valve 28. As hereinbefore set forth, the valve 28 may be opened and closed by operation of the manual lever 88 in lieu of the automatic operator, if desired.

The counterclockwise rotation of the shaft 72 is transmitted to the clapper member 52 through the arm 74, as hereinbefore set forth, and is continued until the clapper member 52 is raised to a substantially horizontal position within the chamber 60, as shown in dotted lines in FIG. 2. The follower member 98 remains in a position adjacent the clapper member 52 until the arm 96 is in a substantially horizontal disposition by the action of the spring 99, as hereinbefore set forth. The second arm or catcher arm 100 moves in a counterclockwise direction simultaneously with the arm 96 until the arm 100 has moved through an angular distance of approximately forty-five degrees. At this position of the arm 100, the flat portion 109 thereof engages the periphery of the bore 46 and further counterclockwise rotation thereof is precluded. The upward movement of the arm 96 as the clapper 52 is raised releases the engagement of the follower member 98 with the first spheroid 102a and the fully opened position of the clapper 52 permits an unimpeded movement of the sphere 102a through the valve 28 and to the position shown in dotted lines in FIG. 2. When the sphere 102a has reached this position, it will fall by gravity through the elbow 38, as shown in FIG. 1, and will enter the pipe line. The sphere 102a will thus be launched.

As hereinbefore set forth, the counterclockwise rotation of the catcher arm 100 is stopped by the engagement of the flat portion 109 with the periphery of the bore 46 upon approximately forty-five degrees of angular movement, whereby the outer extremity or catcher element 108 thereof will be in the position P indicated in dotted lines in FIG. 2. In this position of the arm 100, the catcher element 108 contacts or intercepts the second spheroid 102b, which rolls downwardly in the tube 12 by gravity upon the release of the first spheroid 102a, and precludes passage of the second spheroid through the open valve 28. The sphere 102b is thus retained substantially within the inlet port 46 during the time interval in which the clapper 52 remains in the uppermost or open position. This catching action positively precludes the dumping of more than one sphere during any one launching operation.

After the launching of the sphere 102a, the automatic valve operator (not shown) functions to rotate the shaft 72 in a clockwise direction whereby the clapper member 52 is rotated simultaneously therewith for moving toward a closed position against the valve seat 50. The clockwise movement of the clapper 52 overcomes the action of the spring 99 acting on the arm 96, whereby the arm 96 will be forced in a clockwise rotational direction. As the clapper 52 approaches the fully closed position, the arm 96 is rotated on the shaft 94 and the clutch shoulder 107 thereof approaches the shoulder 105 of the arm 100 which has remained in position with the flat portion 109 against the bore 46 during the release of the sphere 102a. When the arm 96 has been rotated through a sufficient angle, the shoulder 107 engages the shoulder 105, and the rotation of the arm 96 is transmitted to the arm 100 against the action of the spring 110. The clapper 52 is rotated in the clockwise direction until it seats on he valve seat 50, and in this position, the arm member 100 is disengaged from the spheroid 102b and is moved to a substantially horizontal position as shown in solid lines in FIG. 2. The launching apparatus 10 is thus reset, and the next succeeding sphere may be launched in a similar manner at the desired time intervals.

The launching of the individual spheres 102 may be repeated as desired. It will be apparent that the pressure in the tube 12 and the pressure in the elbow 38 are maintained equal at all times during the launching operation by the by-pass conduit 85 and open valve 87. Thus, the pressure on the opposed sides of the clapper 52 will be substantially equal and the opening and closing operation of the clapper 52 will be relatively easy.

*Modified structures*

Figure 7:
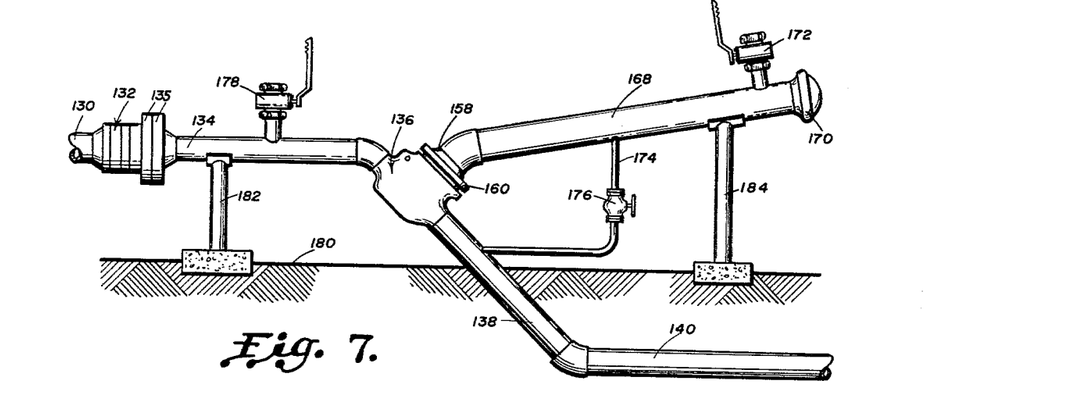
FIGURE 7 is a view similar to FIG. 1 depicting another launching apparatus installation with which the launching mechanism may be utilized.
Figure 8:
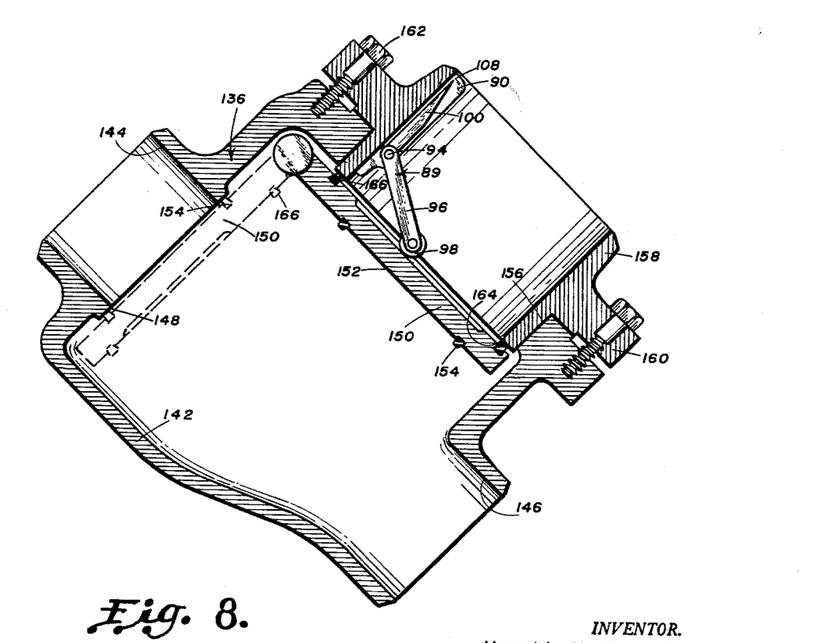
FIGURE 8 is an enlarged sectional elevational view of the launching valve depicted in FIG. 7 with portions shown in dotted lines for purposes of illustration, and showing the launching mechanism as provided therein.

Referring now to FIGS. 7 and 8, a sphere launching installation is depicted such as may be utilized when it is desired to launch spheroids into a pipe line immediately downstream of a well head fluid stream measurement. The fluid stream (not shown) from the well bore (not shown) may be carried through a conduit 130 to any suitable measuring meter or device, such as an orifice plate, generally indicated at 132. The orifice plate 132 may be suitably secured to a second conduit 134 by flanged fittings 135, or the like, and the fluid stream leaving the metering or measuring device 132 flows through the conduit 134 to a meter run launching valve 136. The valve 136 provides communication between the conduit 134 and an angularly disposed pipe 138 which, in turn provides communication with an underground pipe line 140 which may be a part of a gathering system, as is well known.

The valve 136 is preferably disposed or installed with the longitudinal axis thereof at an angle of substantially forty-five degrees with the horizontal, as clearly shown in FIGS. 7 and 8, for a purpose as will be hereinafter set forth. The valve 136 comprises a body 142 having an inlet bore or port 144 and an outlet bore or port 146 for directing the fluid stream from the conduit 132 to the pipe 138. An annular shoulder 148 is provided within the body 142 adjacent the inlet bore 144 to provide a valve seat for a pivotal clapper member 150. The clapper 150 may be pivotally secured within the body 142 in any suitable manner, such as set forth in the valve 28 hereinbefore described in detail, and is preferably actuated or pivoted by an automatic valve operator mechanism (not shown). The face 152 of the clapper member 150 is provided with a seal ring member 154 for sealing against the valve seat 148 in one position of the clapper 150, as will be hereinafter set forth.

A bore 156 is provided in the body and is preferably perpendicularly disposed from the axis of the inlet and outlet bores 144 and 146 for receiving a launching sleeve member 158 therein. The sleeve 158 is provided with an outwardly extending circumferential flange 160 secured to the body 142 by a plurality of spaced bolts 162. The inner end 164 of the sleeve 158 provides a seating surface for the clapper 150 and a sealing ring 166 is provided on the adjacent face of the clapper 150 for sealing thereagainst in one position of the clapper. The normal position for the clapper 150 is in the sealed position against the valve seat 164, as shown in solid lines in FIG. 8, for a purpose as will be hereinafter set forth.

The launching mechanism 89 is secured to the inner periphery of the sleeve 158 in the manner as hereinbefore set forth whereby the roller or follower member 98 is disposed adjacent the clapper 150. It will be readily apparent that upon movement of the clapper 150 toward the position shown in dotted lines in FIG. 8, the arm 96 will move simultaneously therewith to a position substantially parallel with the axis of the sleeve 158 and the arm 100 will move to an angular position of substantially forty-five degrees with respect to the inner periphery of the sleeve 158 for a purpose as will be hereinafter set forth.

The sleeve 158 is suitably connected with a launching tube 168 similar to the tube 12 and having an end closure member 170 similar to the closure member 22. A blow down valve 172 is interposed in the tube 168 and spaced from the closure member 170 to permit relief of the pressure in the tube 168, and a conduit 174 extends between the pipe 138 and the tube 168 for communication of fluid pressure therebetween. A suitable valve 176 is interposed in the conduit 174 for intermittently precluding the flow of fluid therethrough for a purpose as will be hereinafter set forth. It is also preferable to provide a blow down valve 178 in the conduit 134 to permit bleeding of the pressure therein when desired. Of course, the conduit 134 is normally supported from the ground level 180 by a suitable support member 182 and the tube 168 is supported at an angle with respect to the ground level or horizontal by a suitable support member 184. The pipe line 140 is frequently buried in the ground, but it is not limited thereto.

In operation, the meter run launching installation permits the launching of spheroids into the pipe line 140 or the gathering system immediately downstream of the metering device or orifice plate 132. As hereinbefore set forth, the normal position for the clapper 150 is sealed against the seating surface 164 thereby providing open communication between the conduit 134 and pipe 138 and thence to the pipe line 140. The launching tube 168 may be loaded with the spheroids 102 (not shown in FIGS. 7 and 8) in the manner hereinbefore set forth, and the angular disposition of the tube 168 permits the spheroids to fall by gravity toward the clapper 150. The spheroids 102 will be retained behind the clapper 150 in the closed position thereof until it is desired to launch one of the spheres into the pipe line 140. It is to be noted that the clapper 150 is not a free swinging clapper such as utilized in a check valve, or the like, but is positively held in the desired position therefor by the valve operator mechanism, as is well known.

When it is desired to launch a sphere or pig into the pipe line 140, the valve operator (not shown) is actuated in the usual manner for pivoting the clapper 150 toward the valve seat 148 or to the position shown in dotted lines in FIG. 8. This will temporarily stop the flow of the fluid stream through the inlet bore 144 and into the valve body 142. The first spheroid which is resting behind the clapper 150 will drop into the valve body 142 by gravity and will roll downwardly through the outlet port 146 and into the pipe 138 for discharge into the pipe line 140. Simultaneously with the movement of the clapper 150 toward the valve seat 148, the arms 96 and 100 will be rotated about the shaft 94, as hereinbefore set forth, until the arm 96 is moved to a position parallel with the inner periphery of the sleeve 158 and the arm 100 is disposed at an angle of approximately forty-five degrees with respect thereto. Of course, the angular disposition of the valve 136 is not limited to any specific degree, but an angle of forty-five degrees with the horizontal has been found to produce efficient results in the launching operation. With this particular installation of the valve 136, the arm 100 will be disposed substantially parallel with the horizontal in the launching position of the mechanism 89, and the catching element 108 thereof will intercept the second spheroid 102 to preclude the passage thereof into the body 142.

When the first spheroid has been launched or passed into the pipe 138, the clapper 150 may be moved to the normal position adjacent the valve seat 164 whereby the fluid stream will be permitted to flow through the valve body 142 and into the pipe line 140 for moving the launched spheroid through the pipe line. The launching operation may be repeated as desired to launch substantially any number of spheroids into the pipe line 140. The valve operator mechanism (not shown) may be preset at a timed interval for opening of the clapper 150 at predetermined periods of time elapse, or the clapper may be manually actuated to launch spheroids at substantially any desired intervals.

Figure 9:
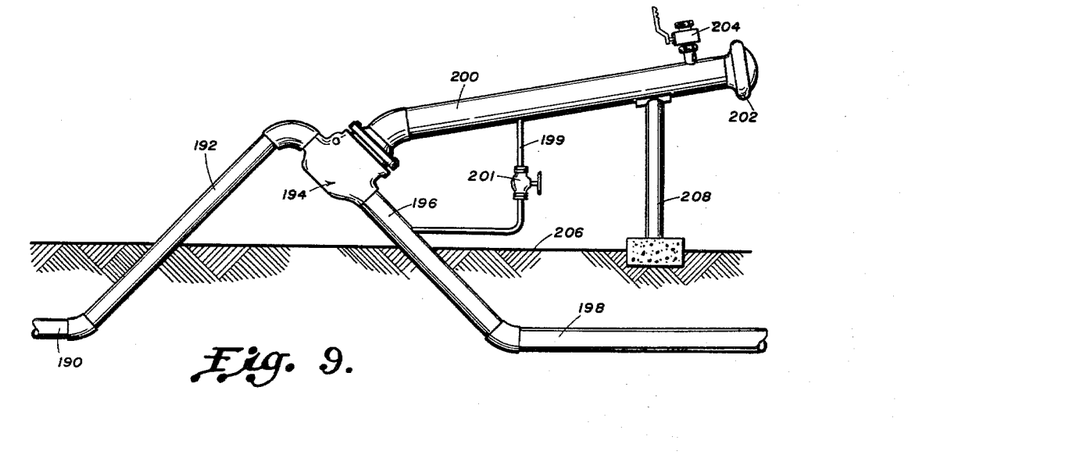
FIGURE 9 is a view similar to FIG. 4 depicting still another launching apparatus installation with which the novel launching mechanism may be utilized.
Figure 10:
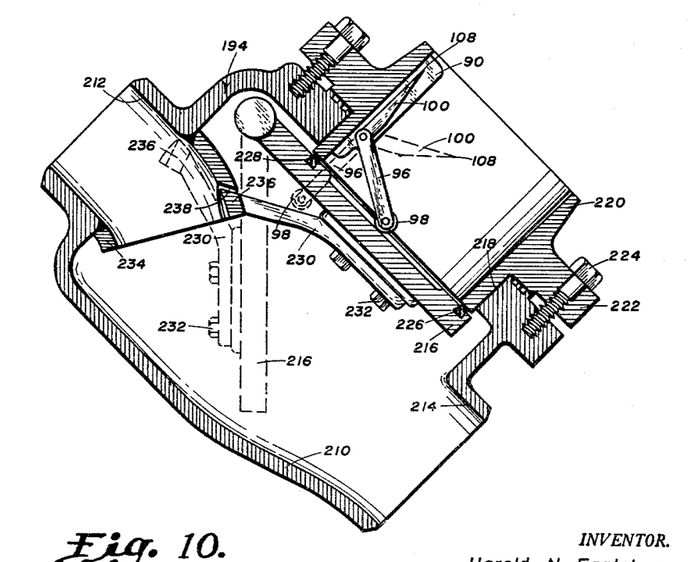
FIGURE 10 is an enlarged sectional elevational view of the launching valve depicted in FIG. 9 with portions thereof shown in dotted lines for purposes of illustration, and showing the launching mechanism secured therein.

Referring now to FIGS. 9 and 10, a trunkline launching installation is illustrated wherein the gathering system comprises pipe line sections of sequentially or progressively increasing sizes and it is desired to launch increasingly larger sized spheroids therein at spaced intervals corresponding to the increased pipe line sizes. The installation depicted in FIG. 9 may be interposed in the pipe line or gathering system at each change of pipe line size, and the next succeeding larger sized spheroid may be launched into the system behind the smaller spheroids.

For example, the relatively smaller pipe line section indicated at 190 is suitably connected with an angularly disposed pipe section 192 wich extends to a position above the ground level. The angular pipe section 192 is suitably secured to a trunkline launcher valve, generally indicated at 194, and the valve 194 is similarly connected with a second angularly disposed pipe section 196 which extends into connection with a relatively larger sized pipe line section 198. The valve 194 is preferably disposed at an angle of substantially forty-five degrees with the horizontal, but not limited thereto, and is in communication with a launching tube 200 similar to the tube 12. A by-pass conduit 199 having a suitable valve 201 interposed therein for communicating fluid pressure from the pipe 196 to the tube 200. The outer end of the tube 200 is provided with a suitable end closure member 202 and a blow down valve 204 is interposed in the tube 200 and spaced from the closure member 202. The tube 200 is preferably disposed at an angle with respect to the ground level 206, or the horizontal, and is suitably supported from the ground by a support member 208. Of course, the angular disposition of the tube 200 permits the spheroids disposed therein to fall downwardly by gravity to a position adjacent the valve 194.

The valve 194 comprises a body 210 having opposed inlet and outlet bores 212 and 214, respectively. The inlet bore 212 is preferably of a smaller diameter than the bore 214, and is of a complementary size with the smaller pipe line section 190. The outlet bore 214 is preferably of a larger diameter complementary to the size of the larger pipe line section 198. A clapper member 216 is pivotally secured within the body 210 in any suitable manner and is preferably a free swinging type of clapper member wherein the weight thereof causes the clapper to hang in a substantially vertical disposition during the normal position thereof, as shown in dotted lines in FIG. 10. A bore 218 is provided in the body 210 and is substantially perpendicularly disposed with respect to the bores 212 and 214 for receiving a launching sleeve 220 therein.

The launching sleeve 220 is provided with an outwardly extending circumferential flange 222 secured to the body 210 by a plurality of spaced bolts 224 for securing the 220 securely to the body 210 and is suitably connected with the tube 200 in any well known manner for receiving the spheroids (not shown in FIGS. 9 and 10) therefrom. The inner end 226 of the sleeve 220 provides a seat for the clapper member 216 in one position thereof and the clapper 216 is provided with a suitable sealing ring 228 on the face thereof adjacent the seat 226 for sealing thereagainst. An angled arm member 230 is secured to the opposite side of the clapper by a plurality of bolts 232 for a purpose as will be hereinafter set forth. The launching mechanism 89 is secured to the inner periphery of the sleeve 220 by the bracket 90 as hereinbefore set forth.

The mechanism 89 is so positioned within the sleeve 220 that the arm 96 is disposed in the proximity of the clapper 216 as shown in solid lines in FIG. 10. However, when the clapper 216 is in the normal vertical position thereof, the arm 96 will be disengaged therefrom since the full rotational movement of the arm 96 is limited when the arm 96 is in a position substantially parallel with the axis of the sleeve 220, and as shown in dotted lines in FIG. 10. In the normal vertical position of the clapper 216, the arm 100 will be disposed at an angle of substantially forty-five degrees from the side walls of the sleeve 220. When the valve 194 is disposed at an angle of forty-five degrees from the horizontal, the arm 100 will thus be disposed in a substantially horizontal position, as shown in dotted lines in FIG. 10. The catching element 108 intercepts the first spheroid from the tube 200 and holds it away from the clapper 216.

An L member 234, preferably a thirty degree L, but not limited thereto, is welded or otherwise secured to the interior of the body 210 around the inlet bore 212 and is so disposed therein as to direct the flow of fluid through the inlet port 212 downwardly or at an angle within the body 210. A relatively small lug member 236 is cut from the outer end of the side wall of the L member 234 to provide an opening 238 therein for clearance of the arm 230. The lug member 236 is welded or otherwise secured to the outer extremity of the angled arm member 230, as clearly shown in FIG. 10. Thus, when the clapper member 216 is moved to a sealed position against the valve seat 226, as will be hereinafter set forth, the lug member 236 will be positioned within the recess or opening 238 in order to provide a relatively unobstructed inner periphery for the L member 234. The flow of the fluid stream through the valve 194 is thus unimpeded throughout the normal operation or usage of the pipe line sections 190 and 198.

When it is desired to launch succeedingly larger pigs or spheroids into the gathering system, it is preferable to provide one of the valves 194 at each change of pipe size in the gathering system. Of course, the smallest spheroids will be launched into the pipe section of the smallest diameter and will continue to move through the pipe lines of greater diameter to the point of removal (not shown) of the spheroids. The next succeeding size spheroid will be launched behind the smallest spheroids and will continue to move through the pipe line therewith to the point of removal, and the launching of increasingly larger spheroids may be continued as desired throughout the gathering system.

As a relatively small spheorid, or the preceding size spheroid, enters the inlet bore 212 of the valve 194, the outer periphery of the small spheroid strikes the lug 236 of the arm 230 and is temporarily stopped within the inlet 212 and L 234. The fluid pressure behind the trapper spheroid (not shown) will build up until sufficient pressure is created on the spheroid for forcing the clapper 216 upwardly against the valve seat 226. As the clapper 216 is moved or pivoted upwardly toward the valve seat 226, the follower 98 is engaged by the clapper and the arm 96 is rotated upwardly about the shaft 94. Prior to the seating of the clapper 216, the clutch shoulder 107 of the arm 96 engages the clutch shoulder 105 of the arm 100 and moves the arm 100 in a counterclockwise direction, as viewed in FIG. 10. The catching element 108 is thus disengaged from the first spheroid (not shown) from the tube 200 whereby the released spheroid will drop by gravity to a position adjacent the seated clapper 216. Of course, the spheroids loaded in the tube 200 are of the next succeeding or larger size than the spheroid moving into the valve 194 through the inlet port 212. In addition, it is preferable that the mechanism 89 be so positioned within the sleeve 220 and so designed that the larger spheroid from the tube 200 is not released by the catching element 108 until the clapper is within approximately ten degrees of the closed position against the valve seat 226. This particular timing permits the clapper 216 to be completely closed against the seat 226 before the larger spheroid contacts the clapper, and thus all of the spheres contained in the tube 200 do not have to be pushed upwardly therein by the clapper.

As soon as the clapper 216 is moved into the closed position against the seat 226 by the smaller spheroid, the smaller spheroid will be propelled through the body 210 and out the bore 214 for discharge into the pipe line section 198 by the high fluid pressure which has built up behind the spheroid during the trapping thereof within the valve 194. When the smaller spheroid moves out of the body 210, the clapper 216 is free to return to the normal vertical position. Of course, the weight of the spheroid resting thereon facilitates the downward movement or opening of the clapper 216. The larger spheroid resting on the clapper 216 is dumped into the body 210 and moves through the pipe 196 for discharge into the pipe section 198. The larger spheroid will move through the pipe line 198 behind the relatively smaller spheroid.

As the clapper 216 moves toward the normal vertical position therefor, the arms 96 and 100 will be rotated in a clockwise direction about the shaft 94 by the action of the springs 99 and 110, as hereinbefore set forth, whereby the catching element 108 of the finger 100 will intercept the second or next succeeding spheroid from the tube 200 and positively preclude the dumping of more than one spheroid into the body 210 during one launching operation. The launching valve 194 is thus reset for launching another spheroid upon the passage of a second relatively smaller spheroid through the valve.

It is to be noted that substantially any number of trunkline launching installations as shown in FIGS. 9 and 10 may be interposed in a pipe line or gathering system. Of course, after the spheroids have passed through several of the valves 194, there will be several sizes of spheroids within the pipe line. However, each valve 194 is so designed to be actuated only by the preceding smaller spheroid, and the spheroids which are exceedingly smaller will pass through the valve 194 without actuating the launching mechanism. Thus, there is no possibility of launching a larger spheroid in front of a smaller spheroid.

The operation of the launching valve 194 is completely mechanical in response to the movement of a relatively smaller spheroid therethrough, and thus automatically launches a larger spheroid into the pipe line directly behind the smaller spheroid. There is no necessity for any type of valve control mechanism or valve operator, either hydraulic, pneumatic, electrical or the like. Furthermore, the slight build up of pressure behind the temporarily trapped smaller spheroid will retard the downward motion of the clapper during the release of the larger spheroid into the pipe line, but the resulting high velocity of the gas surge through the valve body caused by the pressure build up may be controlled by properly selecting the inside diameter of the internal L member 234. In this manner, it can be assured that there will not be any objectionable pressure rises in the gathering system.

From the foregoing, it will be apparent that the present invention provides a novel launching apparatus for injecting spheroids, or pigs, into a pipe line. The novel launching mechanism may be utilized with a variety of launching valves in a plurality of launching installations for efficiently launching one spheroid at a time into a pipe line or gathering system. The launching mechanism provides for the releasing of one spheroid with a subsequent intercepting of the next succeeding spheroid for positively precluding the dumping of a plurality of the spheroids into the pipe line at one time. The mechanism may be readily reset for the launching of the next succeeding spheroid at the desired time interval. The launching mechanism may be utilized for launching spheroids immediately downstream from a well head measurement. Furthermore, the launching mechanism may be utilized for launching succeedingly larger sized spheroids in a pipe line or gathering system comprising progressively increased diameter pipe sections. The novel launching mechanism is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In combination with a pivotal closure member, a launching mechanism for injecting spheroids into a pipe line and comprising a shaft, a releasing arm journalled on the shaft and engageable with the closure member for injecting the first spheroid into the pipe line upon movement of the closure member in one direction, a catcher arm journalled on the shaft, means constantly urging the releasing arm and catcher arm in a direction toward the closure member, stop means provided on the catcher arm for limiting the rotation thereof in one direction for permitting limited independent rotation of the releasing arm simultaneously with the closure member whereby the first spheroid is released and the catcher arm intercepts the next succeeding spheroid for precluding injection of more than one spheroid during a single operation, and means cooperating between the releasing arm and the catcher arm for disengaging the catcher arm from the next succeeding spheroid upon rotation of the closure member and releasing arm in a second direction whereby the launching mechanism is reset for a subsequent injection of the next succeeding spheroid into the pipe line.

2. In combination with a launching valve having a pivotal closure member therein, a launching mechanism comprising a shaft secured within the valve, a follower arm journalled on the shaft, spring means disposed around the shaft for urging the follower arm in a direction toward the closure member whereby the follower arm rotates simultaneously therewith, a catcher arm journalled on the shaft, spring means disposed around the shaft for urging the catcher arm in a direction toward the closure member, stop means provided on the catcher arm for limiting the rotation thereof in one direction to permit limited independent rotation of the follower arm with respect to the catcher arm, and clutch means cooperating between the follower arm and catcher arm for resetting the launching mechanism upon rotation of the closure member in one direction.

3. In combination with a pipe line, a launching apparatus for injecting spheroids into the pipe line and comprising a valve interposed in the pipe line and disposed at an angle with respect to the horizontal, said valve comprising a body having opposed inlet and outlet bores and a third bore disposed substantially perpendicularly thereto, a launching sleeve secured in the third bore and providing a valve seat in the body, a pivotal clapper member secured in the body for alternate positions adjacent the inlet bore and the valve seat, a launching mechanism secured in the launching sleeve in the proximity of the clapper member, a launching tube secured to the launching sleeve for initially receiving a plurality of spheroids therein, said launching mechanism comprising a follower arm disposed adjacent the clapper and movable therewith for releasing a single spheroid into the valve body in one position of the clapper, a pivotal catcher arm having means carried thereby to limit pivotal movement thereof in one direction for intercepting the next succeeding spheroid for precluding the release of more than one spheroid into the valve body during one launching operation, and means cooperating between the follower arm and catcher arm for resetting thereof in a second position of the clapper for the subsequent release of said next succeeding spheroid into the valve body.

4. In a launching valve for releasing progressively larger spheroids into a pipe line, a valve body disposed at angle with respect to the horizontal and having opposed inlet and outlet bores for passage of a relatively small spheroid therethrough, a launching sleeve secured to the body substantially perpendicular with respect to the inlet and outlet bores to provide a valve seat within the body, a pivotal clapper member disposed in the body and having a normal position in the proximity of the inlet bore and positioned to partially block said inlet bore, a launching mechanism disposed in the launching sleeve in the proximity of the valve seat, said clapper member adapted to be engaged by the said small spheroid for movement in a direction toward the valve seat, said launching mechanism engageable with the clapper for actuation by the movement of the clapper member in the said direction toward the valve seat for releasing a relatively larger spheroid into a position adjacent the clapper member whereby the weight thereof will move the clapper in a direction toward the inlet bore for injecting the larger spheroid into the body, and means provided in said launching mechanism for engaging the next succeeding larger spheroid for precluding the injecting of more than one spheroid during one launching operation.

5. In combination with a launching valve having a housing and a pivotal closure member therein to provide alternate open and closed positions for the valve, a launching mechanism comprising a shaft disposed in the housing, a spring urged follower arm journalled on the shaft and movable in one direction upon opening of the valve for releasing an object for passage through the valve, a spring urged catcher arm journalled on the shaft independently of said follower arm, clutch means cooperating between the follower arm and catcher arm to provide for simultaneous rotation of the catcher arm with the follower and also permitting limited relative rotation between the catcher arm and the follower arm, stop means cooperating with the catcher arm for limiting the movement of the catcher arm upon opening of the valve whereby the catcher arm is positioned for intercepting the next succeeding object to preclude passage of multiple objects of a similar size during a single opening of the valve, and said clutch means providing for simultaneous rotation of the follower arm and catcher arm upon closing of the valve for resetting the launching mechanism whereby the said next succeeding object may be launched upon reopening of the valve.

References Cited by the Examiner
UNITED STATES PATENTS

| | | | |
|---|---|---|---|
| 182,761 | 10/76 | Kelly | 221—301 |
| 1,778,952 | 10/30 | McCullough | 221—301 |
| 2,279,093 | 4/42 | Peters | 221—301 X |
| 2,818,592 | 1/58 | Scaramucci | 15—104.06 |
| 2,965,125 | 12/60 | Osborne et al. | 15—104.06 X |
| 3,000,028 | 9/61 | Buie et al. | 15—104.06 |

WALTER A. SCHELL, *Primary Examiner.*

CHARLES A. WILLMUTH, *Examiner.*